(No Model.) 2 Sheets—Sheet 1.

M. WEINRICH.
METHOD OF AND APPARATUS FOR THE PRODUCTION OF REFINED SUGAR IN PLATES, STICKS, AND OTHER LIKE FORMS.

No. 255,359. Patented Mar. 21, 1882.

WITNESSES: Theo. G. Hoster, C. Sedgwick

INVENTOR: M. Weinrich
BY Munn & Co.
ATTORNEYS.

N. PETERS, Photo-Lithographer, Washington, D. C.

(No Model.) 2 Sheets—Sheet 2.
M. WEINRICH.
METHOD OF AND APPARATUS FOR THE PRODUCTION OF REFINED SUGAR IN PLATES, STICKS, AND OTHER LIKE FORMS.
No. 255,359. Patented Mar. 21, 1882.
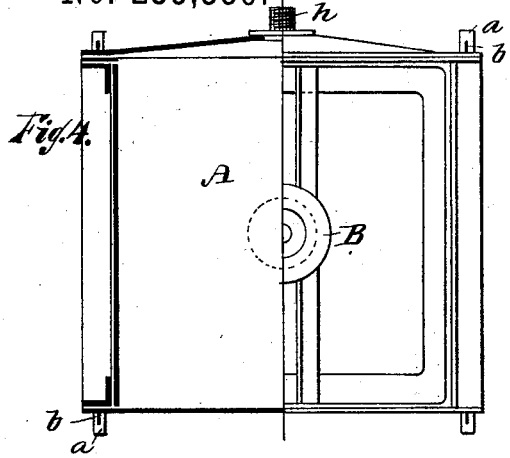
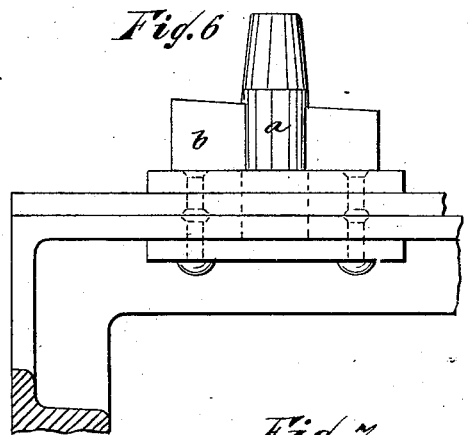
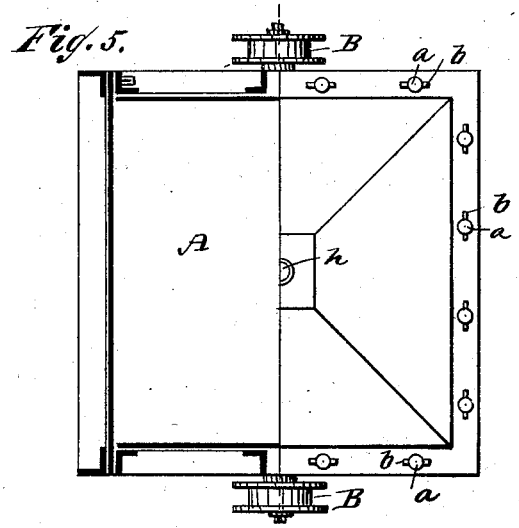
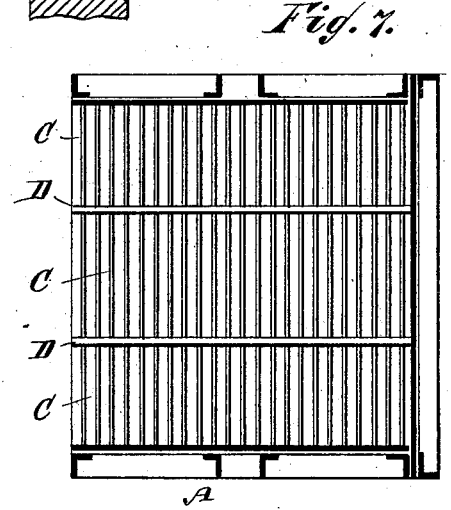
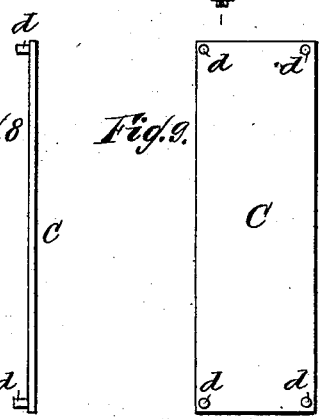
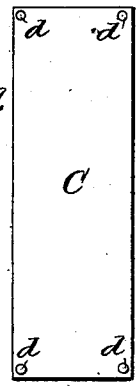
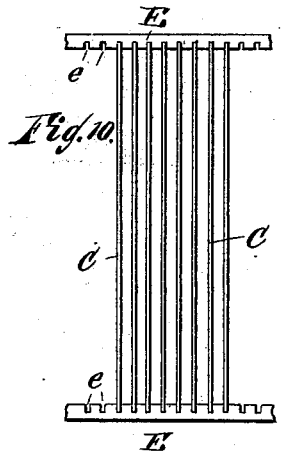
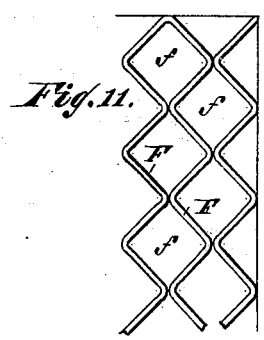
WITNESSES:
Theo. G. Hoster
C. Sedgwick
INVENTOR:
M. Weinrich
BY Munn & Co.
ATTORNEYS.

United States Patent Office.

MORIZ WEINRICH, OF VIENNA, AUSTRIA.

METHOD OF AND APPARATUS FOR THE PRODUCTION OF REFINED SUGAR IN PLATES, STICKS, AND OTHER LIKE FORMS.

SPECIFICATION forming part of Letters Patent No. 255,359, dated March 21, 1882.

Application filed January 31, 1882. (No model.)

*To all whom it may concern:*

Be it known that I, MORIZ WEINRICH, of Vienna, Austria, have invented certain new and useful Improvements in Apparatus for and Process of the Production of Refined Sugar in Plates, Sticks, and other Like Forms, of which the following is a full, clear, and exact description.

This invention relates to the production of refined sugar in the form of plates, bars, sticks, or other similar forms.

The object of my invention is to facilitate producing highly refined and pure sugar, which can easily be reduced to small cubical blocks or to lumps without any alterations of the claying-rooms in use at present and without requiring any additional expense.

The invention consists in a pan connected with a suction-pump, and also provided with transverse bars for supporting the sugar-receiving boxes, which are subdivided by partitions or plates according to the shape and thickness of the desired slabs or sticks of sugar that are to be produced.

The invention also consists in the method of producing clear and pure sugar slabs and sticks by pouring the sugar into suitable boxes subdivided according to the thickness and form of the slabs, then withdrawing the sirup, then clarifying the remaining sugar, and finally hardening or drying the same, as will be fully described hereinafter.

Reference is to be had to the accompanying drawings, forming part of this specification, in which similar letters of reference indicate corresponding parts in all the figures.

Figure 1:
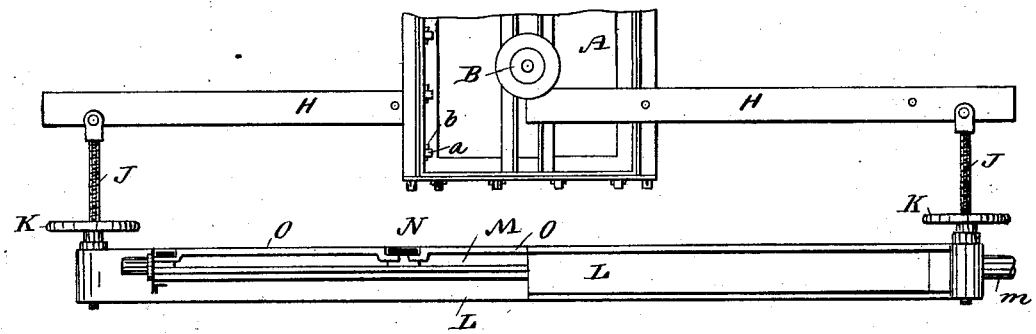
Figure 2:
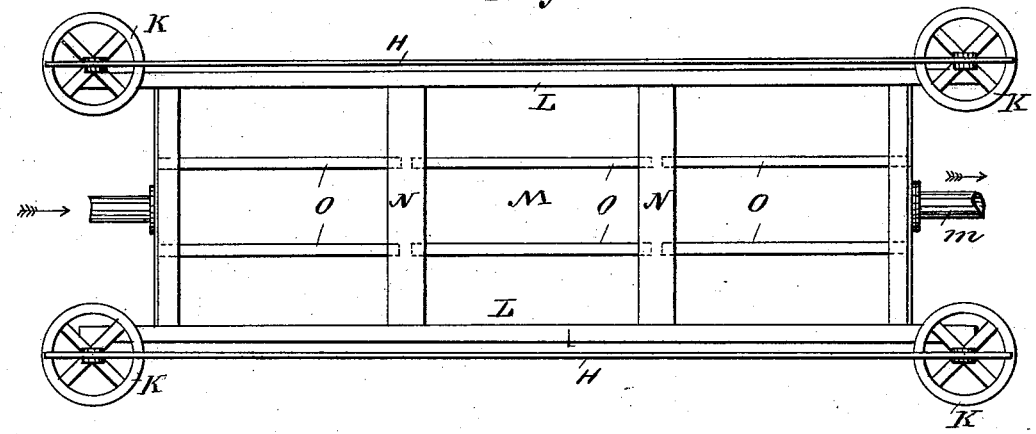
Figure 3:
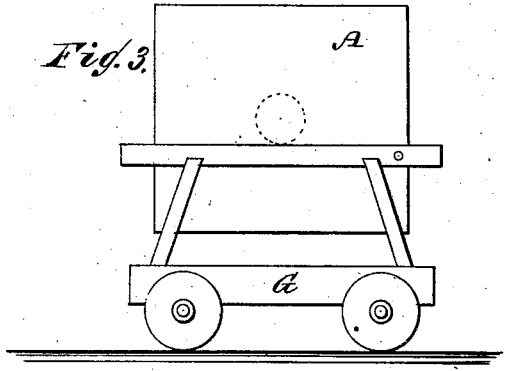

Figure 1 is a longitudinal elevation of the sugar-box and its adjustable track, parts being shown in section. Fig. 2 is a plan view of the track and claying apparatus. Fig. 3 is a longitudinal elevation of the sugar-box and of the track for conveying it from the filling-house. Fig. 4 is a side elevation of the sugar-box, parts being shown in section. Fig. 5 is a plan view of the same, parts being shown in section. Fig. 6 is a longitudinal detail elevation of a part of the sugar-box, showing the manner in which the walls are united. Fig. 7 is a sectional plan view of the sugar-box, showing the arrangement of the subdividing plates or partitions. Fig. 8 is a side elevation of one of the subdividing plates or partitions. Fig. 9 is a front elevation of the same. Fig. 10 is a plan view of a series of plates, showing the manner in which they are held in place in the box. Fig. 11 is a plan view of the modified arrangement of the partitions if sticks of sugar are to be made.

The box A, into which the sugar is to be placed, is made cubical, oblong, or of any other suitable shape. The sides are made of sheet-iron, held to wrought-iron frames, the parts being held together by pintles $a$ and wedges $b$, as shown in Fig. 6. The top and bottom and one side of the box A are adapted to be removed separately. A roller or wheel, B, is pivoted on each fixed or stationary side of the box A, at or near the middle of the sides, for the purpose of facilitating the moving and tilting of this box.

The box A is subdivided into a series of compartments by plates or partitions C, arranged in one or more rows by transverse partitions D. The partitions or plates C are arranged a greater or less distance from each other, according to the desired thickness of the slabs or plates of sugar. In order to hold the plates or partitions C separated the proper distances, these plates are provided at the corners with studs or projections $d$, as shown in Figs. 8 and 9, the ends of which studs rest against the surface of the adjoining plate; or the box A is provided at the top and bottom of the fixed sides with removable notched strips E, into the notches or recesses $e$ of which the edges of the plates or partitions C are passed, as shown in Fig. 10.

If bars or sticks of sugar are to be produced, the box A is provided with zigzag plates or partitions F, as shown in Fig. 11, and constructed according to the system known as "Seyferth's" system. These plates F form rectangular or diamond-shaped or other compartments or cells, $f$, which can be of different sizes, according to the desired thickness of the sticks of sugar to be produced.

The box A is placed upon a truck or wagon, G, Fig. 3, and conveyed to the filling-house, and is filled in one operation with sugar having a temperature of not less than 70° Reaumur, (189½° Fahrenheit.) I prefer to make the boxes A of such size that they can hold from seven to eight hundred-weight of sugar. The contents of the boxes A may be allowed to cool in the filling-house; or the boxes may be taken directly to the hot floor, where they are wheeled upon a claying apparatus of peculiar construction, (shown in Figs. 1 and 2,) which may be adapted to carry any suitable number of boxes A.

The rails H, upon which the boxes A are wheeled from the trucks G, can be raised by means of screws J and hand-wheels K, mounted on these screws, as shown in Figs. 1 and 2.

Between the longitudinal bars L of the frame of the claying apparatus there is an open pan, M, over which the lower edges of the boxes A fit upon bars. The bars L are connected on top by a series of transverse bars, N, which are separated such distances that the ends of the boxes A can rest on them. When the sugar in the boxes A has stiffened or "set" the bottoms of the boxes are removed and the track-rails H are lowered by means of the screws and hand-wheels until the lower edges of the boxes A rest on the side bars, L, and bars N, suitable packing-strips being placed on the bars L and N for the purpose of forming air-tight joints.

In order to prevent the contents of the boxes A from falling out through the open bottom, the transverse bars N are connected by a series of longitudinal bars or strips, O, upon which the contents of the boxes A can rest. A suction-pump, the tube $m$ of which is connected with the pan or sirup-receiver, is then operated, and the green sirup is thus removed from the contents of the boxes.

As the open bottoms of the boxes A present a very large drainage-surface, the sirup is removed so rapidly that the operation of liquoring may be commenced after a few hours. This operation is performed under pressure, and for this purpose the cover of the box A is secured on the same, and a tube leading from the reservoir containing the clarifying-liquor is screwed on the threaded neck $h$ of the box A. The clarifying of the sugar then takes place, according to the nature of the sugar, in part with and in part without interruptions of the exhausting action of the pump. If the sugar has a good sharp grain, this operation is completed in about one and a half or two days. The white clayed mass is thus completely deprived of its sirup by the action of the pump, after which the drying takes place, which is carried out most expeditiously and effectually in the following manner: The suction-pipe of the pump is disconnected from the pan M and is screwed on the threaded neck $h$ of the top of the box, and heated air having a temperature of from 40° to 50° Reaumur (112° to 144½° Fahrenheit) is admitted into the pan M. By the exhausting action of the pump the heated air is caused to permeate the contents of the box A. In consequence of the rarefaction or partial vacuum thus produced the drying takes place very rapidly and is completed in from about fifteen to twenty-four hours. The air may be heated in any well-known suitable manner. When the drying is completed the box A is again elevated by means of the screws and hand-wheels and the detachable sides and the cover are removed. The box is then tilted to an angle of ninety degrees, and the partitions or plates C are taken out, together with the white sugar, in the form of slabs or bars, which may be reduced to cubes or lumps of the desired dimensions and forms.

I have described the operation as taking place with one box; but it is evident that it can take place with a number of boxes at the same time.

Having thus fully described my invention, I claim as new and desire to secure by Letters Patent—

1. In a sugar-clarifying apparatus, the pan or sirup-receiver M, constructed, substantially as herein shown and described, with a series of transverse bars, N, and longitudinal bars O, as set forth.

2. In a sugar-clarifying apparatus, the pan or sirup-receiver M, combined with a series of sugar-receiving boxes, A, fitting on the same, substantially as herein shown and described, and for the purpose set forth.

3. The combination, with the pan or sirup-receiver M, of the side bars, L, the transverse bars N, the longitudinal bars O, and one or more sugar-receiving boxes, A, fitting on the pan, substantially as herein shown and described, and for the purpose set forth.

4. The combination, with the pan or sirup-receiver M, of the side bars, L, the transverse bars N, the longitudinal bars O, the rails H, the screws J, and the hand-wheels K, substantially as herein shown and described, and for the purpose set forth.

5. The combination, with the box A, of the partitions C, provided with studs or projections $d$, substantially as herein shown and described, and for the purpose set forth.

MORIZ WEINRICH.

Witnesses:
ED. SCHMIDT,
JOH. LUXT.